United States Patent
Wu et al.

(10) Patent No.: US 11,820,260 B2
(45) Date of Patent: Nov. 21, 2023

(54) CHILD SAFETY SEAT

(71) Applicant: Wonderland Switzerland AG, Steinhausen (CH)

(72) Inventors: Bo Wu, Dongguan (CN); Yanmin Chen, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 7 days.

(21) Appl. No.: 17/503,329

(22) Filed: Oct. 17, 2021

(65) Prior Publication Data
US 2022/0118888 A1 Apr. 21, 2022

(30) Foreign Application Priority Data
Oct. 19, 2020 (CN) .......................... 202022337083.7

(51) Int. Cl.
*B60N 2/28* (2006.01)
*A44B 11/04* (2006.01)

(52) U.S. Cl.
CPC ............ B60N 2/2812 (2013.01); A44B 11/04 (2013.01); *B60N 2002/2815* (2013.01)

(58) Field of Classification Search
CPC .......... B60N 2/2812; B60N 2002/2815; A44B 11/04
USPC ......................................... 297/250.1, 256.15
See application file for complete search history.

(56) References Cited

U.S. PATENT DOCUMENTS

| | | | | |
|---|---|---|---|---|
| 6,189,970 B1 * | 2/2001 | Rosko | ................. | B60N 2/2812 297/250.1 |
| 6,543,847 B2 * | 4/2003 | Balensiefer | ............ | A47D 13/02 297/250.1 |
| 6,698,841 B1 * | 3/2004 | Glover | ................. | B60N 2/2812 297/484 |
| 7,469,965 B2 * | 12/2008 | Glover | ................. | B60N 2/2812 297/484 |
| 7,648,199 B2 * | 1/2010 | Amesar | ................. | B60N 2/2809 297/472 |
| 7,735,919 B2 * | 6/2010 | Chen | ....................... | B60R 22/26 297/484 |
| 10,575,658 B2 * | 3/2020 | Romero | ................... | A47D 1/02 |
| 2011/0133532 A1 * | 6/2011 | Zhao | .................... | B60N 2/2812 297/250.1 |
| 2012/0019034 A1 * | 1/2012 | Young | ................. | A47D 15/006 297/256.15 |

FOREIGN PATENT DOCUMENTS

EP 650872 A1 * 5/1995 ........... B60R 22/105
KR 102120986 B1 * 6/2020

* cited by examiner

*Primary Examiner* — Milton Nelson, Jr.
(74) *Attorney, Agent, or Firm* — NZ CARR LAW OFFICE

(57) ABSTRACT

A child safety seat includes a seat body, and a restraining harness coupled to the seat body. The seat body has a front surface and a rear surface opposite to each other, the front surface being adapted to provide support for a child placed in the seat body. The restraining harness includes a restraining belt and an adjusting buckle coupled to each other, the restraining belt having a front belt portion extending in front of the front surface and a rear belt portion extending behind the front surface, the adjusting buckle being provided on the rear belt portion and being operable to adjust a length of the front belt portion.

5 Claims, 4 Drawing Sheets

CHILD SAFETY SEAT

CROSS-REFERENCE TO RELATED APPLICATION(S)

This application claims priority to China patent application no. 202022337083.7 filed on Oct. 19, 2020.

BACKGROUND

1. Field of the Invention

The present invention relates to child safety seats.

2. Description of the Related Art

A child safety seat is typically used in an automobile vehicle to properly restrain a child in the event of accidental collision. FIG. 1 is a schematic view illustrating a restraining harness provided in a conventional child safety seat 200. Referring to FIG. 1, the child safety seat 200 typically includes a seat body 201, and a restraining harness including two shoulder belts 202 coupled to the seat body 201. Each shoulder belt 202 extends at a front of the seat body 201, and usually has a three-bar buckle 203 for adjusting a length of the shoulder belt 202. During use, the three-bar buckle 203 contacts the child when the restraining harness is fastened, which may result in an uncomfortable pressure applied by the three-bar buckle 203 on the child. Moreover, the shoulder belt 202 may undesirably slip through the three-bar buckle 203, which causes loosening of the shoulder belt 202.

Therefore, there is a need for an improved child safety seat that can address at least the foregoing issues.

SUMMARY

The present application describes a child safety seat that can prevent undesirable loosening of the restraining harness in use.

According to one aspect, the child safety seat includes a seat body, and a restraining harness coupled to the seat body. The seat body has a front surface and a rear surface opposite to each other, the front surface being adapted to provide support for a child placed in the seat body. The restraining harness includes a restraining belt and an adjusting buckle coupled to each other, the restraining belt having a front belt portion extending in front of the front surface and a rear belt portion extending behind the front surface, the adjusting buckle being provided on the rear belt portion and being operable to adjust a length of the front belt portion.

DETAILED DESCRIPTION OF THE EMBODIMENTS

Figure 1:
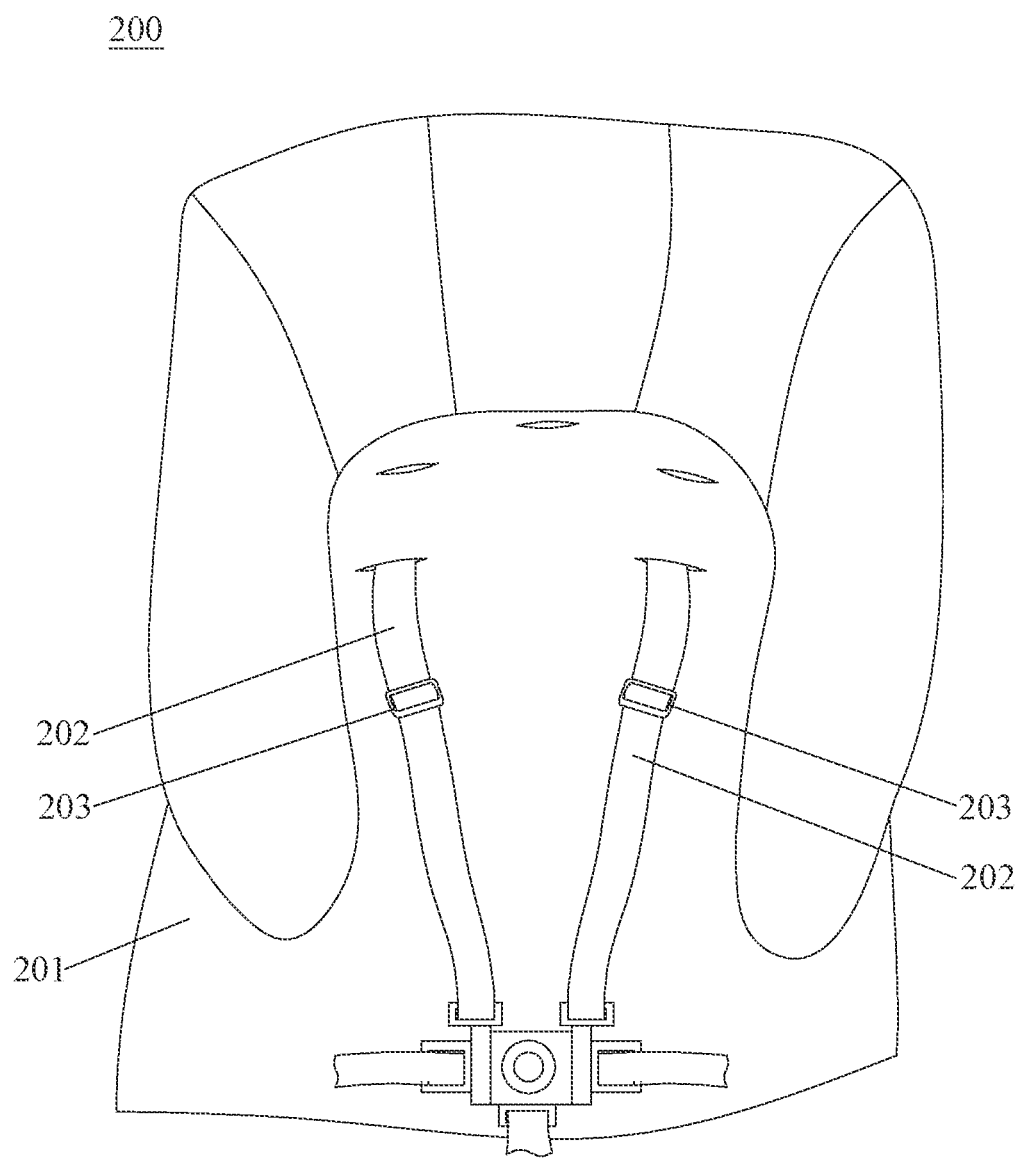
FIG. 1 is a schematic front view of a conventional child safety seat.
Figure 2:
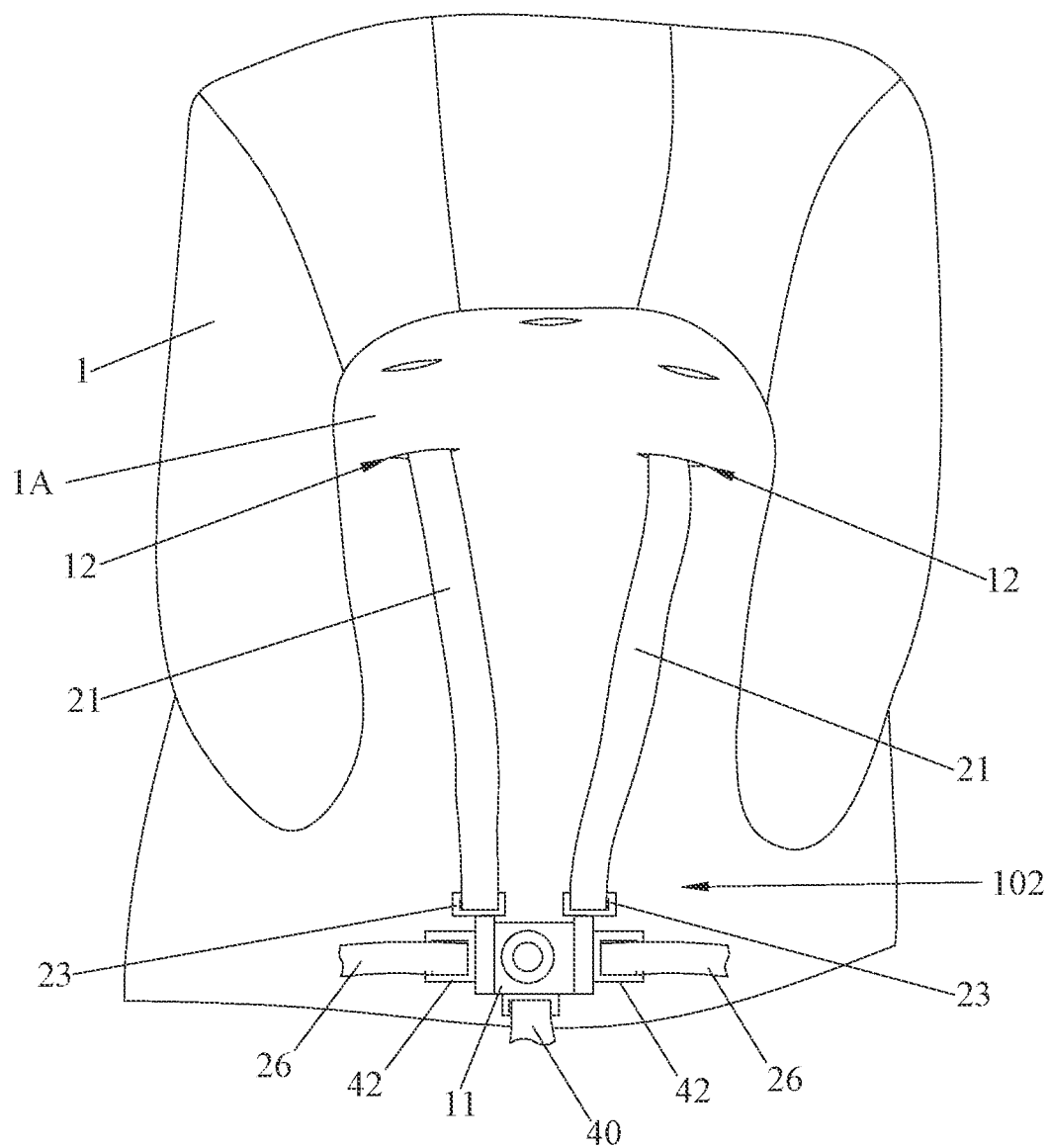
FIG. 2 is a schematic view illustrating construction details of a restraining harness at a front side of a child safety seat according to an embodiment of the present disclosure.
Figure 3:
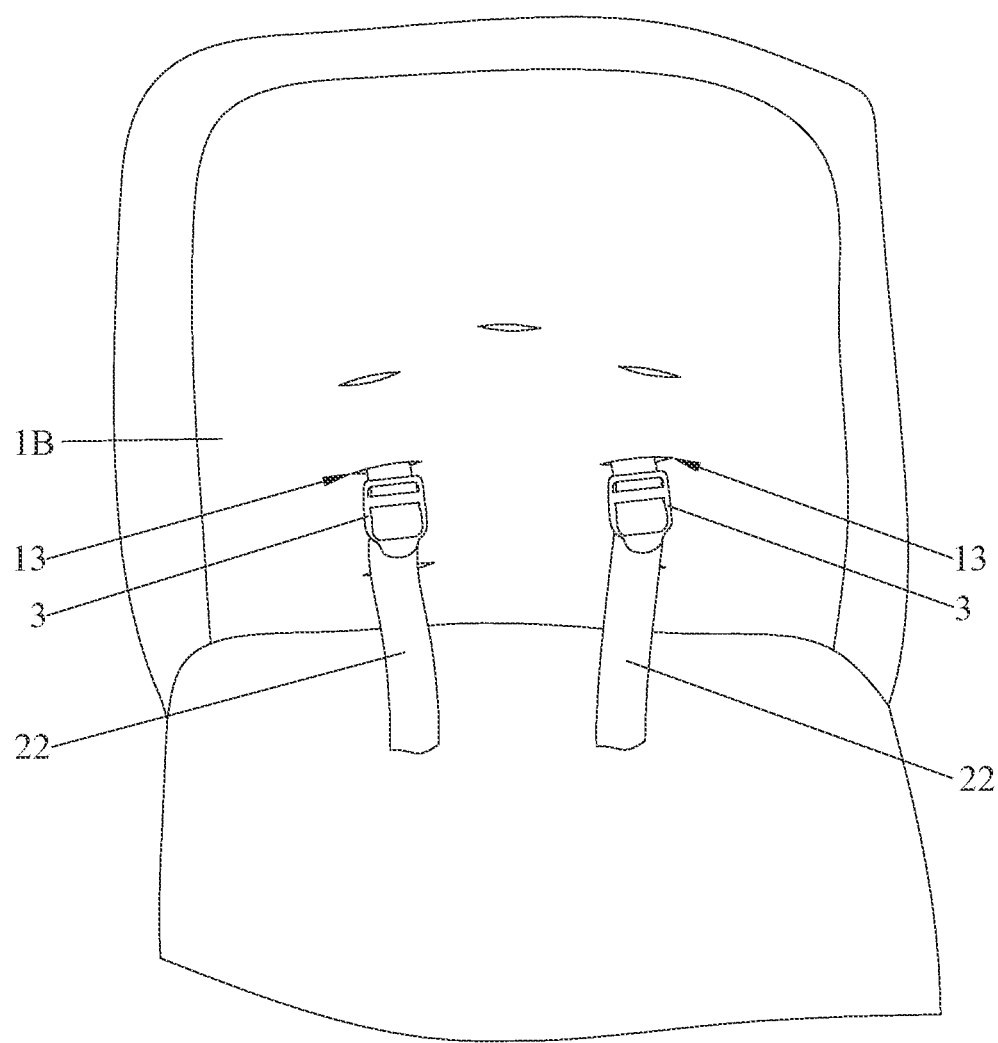
FIG. 3 is a schematic view illustrating construction details of the restraining harness at a rear side of the child safety seat according to an embodiment of the present disclosure.
Figure 4:
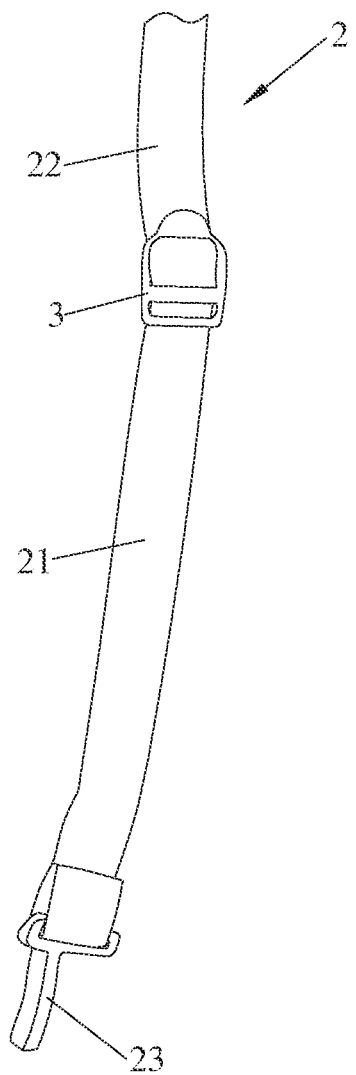
FIG. 4 is a perspective view illustrating some construction details of a restraining belt provided in the restraining harness.

Referring to FIGS. 2-4, the child safety seat 100 includes a seat body 1, and a restraining harness 102 coupled to the seat body 1. The seat body 1 is adapted to receive a child. The seat body 1 can be a seat shell made of rigid materials including, e.g., plastics materials. The seat body 1 can have a front surface 1A and a rear surface 1B opposite to each other. The front surface 1A is adapted to provide support for a child placed in the seat body 1. For example, the front surface 1A may be defined on a backrest portion of the seat body 1 and can extend to a seat portion of the seat body 1.

The restraining harness 102 is configurable to wrap around a child for restraining the child on the seat body 1. The restraining harness 102 can include two restraining belts 2 that are threaded through the seat body 1. The two restraining belts 2 can be shoulder belts of the restraining harness 102. Each of the two restraining belts 2 is threaded through a front opening 12 provided on the front surface 1A of the seat body 1, and has a front belt portion 21 extending from the front opening 12 in front of the front surface 1A of the seat body 1. Moreover, each of the two restraining belts 2 is threaded through a rear opening 13 provided on the rear surface 1B of the seat body 1, and has a rear belt portion 22 extending from the rear opening 13 behind the front surface 1A and at least partially alongside of the rear surface 1B of the seat body 1. The restraining belt 2 comprised of the front belt portion 21 and the rear belt portion 22 can be formed from a single continuous webbing material. When a child is placed on the seat body 1 against the front surface 1A, the two restraining belts 2 can be installed so that the front belt portion 21 of each restraining belt 2 wraps around the body of the child.

Referring to FIGS. 2-4, the restraining harness 102 further includes two adjusting buckles 3 respectively coupled to the two restraining belts 2. Each of the two adjusting buckles 3 is provided on the rear belt portion 22 behind the front surface 1A of the seat body 1, and is operable to adjust a length of the front belt portion 21 extending in front of the front surface 1A. The length of the front belt portion 21 may be adjusted, e.g., in accordance with the size of the child received in the seat body 1. According to an example of construction, each adjusting buckle 3 may be a three-bar buckle, and each restraining belt 2 can be coupled to the corresponding adjusting buckle 3 by threading the rear belt portion 22 through the adjusting buckle 3. The adjusting buckles 3 may be disposed in abutment against the rear surface 1B of the seat body 1. In this manner, operation of the adjusting buckle 3 and the rear belt portion 22 for adjusting the length of the front belt portion 21 may be facilitated. Moreover, the rear belt portions 22 of the restraining belts 2 may be anchored to the rear surface 1B of the seat body 1 with the adjusting buckles 3.

Referring to FIG. 2, the restraining harness 102 can further include a buckle 11 coupled to the seat body 1. The buckle 11 may be coupled to the seat body 1 via a crotch belt 40. Each restraining belt 2 is respectively coupled to a connector 23 that can be attached to the buckle 11 for fastening the restraining harness 102 and detached from the buckle 11 for unfastening the restraining harness 102. The connector 23 can be provided at a free end of the front belt portion 21 on the corresponding restraining belt 2.

Various constructions may be applied for attaching the connectors 23 of the restraining belts 2 to the buckle 11. In the illustrated example, the restraining harness 102 further includes two lap belts 26 respectively coupled to two connectors 42 operable to engage and disengage the buckle 11, and the two connectors 23 may be respectively attached to the buckle 11 via the two connectors 42 of the lap belts 26. For fastening the restraining harness 102, the two connectors 23 of the restraining belts 2 are respectively assembled with the two connectors 42 of the lap belts 26, and the connectors 23 and 42 are then attached to the buckle 11 by engaging the two connectors 42 with the buckle 11. For unfastening the restraining harness 102, the two connectors 42 are respectively disengaged from the buckle 11 so that the connectors 42 of the lap belts 26 and the connectors 23 of the restraining belts 2 can be detached from the buckle 11.

According to another example of construction, the connectors 23 of the restraining belts 2 may be configured to engage with the buckle 11 for directly attaching the connectors 23 to the buckle 11. For example, each connector 23 and the buckle 11 may respectively have structural features that can be brought in contact against each other for attaching the connector 23 to the buckle 11 and moved away from each other for detaching the connector 23 from the buckle 11.

In the restraining harness 102 described herein, the placement of the adjusting buckles 3 on the rear belt portions 22 of the restraining belts 2 can assist in anchoring the rear belt portions 22 of the restraining belts 2 to the rear surface 1B of the seat body 1, and avoid contact between the adjusting buckles 3 and the child during use. As a result, undesirable slipping of the restraining belts 2 through the adjusting buckles 3 and consequent loosening of the restraining belts 2 can be prevented. Moreover, the restraining belts 2 can offer a more comfortable contact between the front belt portions 21 and the body of the child because each of the front belt portions 21 between the front opening 12 and the connector 23 is free of length adjusting buckles.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
    a seat body having a front surface and a rear surface opposite to each other, the front surface being adapted to provide support for a child placed in the seat body; and
    a restraining harness coupled to the seat body, the restraining harness including a restraining belt and an adjusting buckle coupled to each other, the restraining belt being threaded through a front opening on the front surface and a rear opening on the rear surface, the restraining belt having a front belt portion extending in front of the front surface and a rear belt portion extending behind the front surface, the adjusting buckle being provided on the rear belt portion and being operable to adjust a length of the front belt portion;
    wherein the restraining belt comprised of the front belt portion and the rear belt portion is formed from a single continuous webbing material that is threaded through the adjusting buckle and terminates at an end that freely hangs below the adjusting buckle, and the adjusting buckle is positionable in contact against the rear surface of the seat body adjacent to the rear opening by pulling on the front belt portion.

2. The child safety seat according to claim 1, wherein the restraining belt is a shoulder belt.

3. The child safety seat according to claim 1, wherein the restraining harness further includes a buckle coupled to the seat body, and a free end of the front belt portion has a connector operable to attach to and detach from the buckle.

4. The child safety seat according to claim 3, wherein the buckle is coupled to the seat body via a crotch belt.

5. The child safety seat according to claim 3, wherein the front belt portion between the front opening and the connector is free of length adjusting buckles.

* * * * *